United States Patent [19]
Marcenac

[11] Patent Number: 6,128,118
[45] Date of Patent: Oct. 3, 2000

[54] OPTICAL TRANSMISSION SYSTEMS USING SPECTRAL INVERSION FOR DISPERSION AND NON-LINEARITIES COMPENSATION

[75] Inventor: Dominique David Marcenac, Ipswich, United Kingdom

[73] Assignee: British Telecommunications, London, United Kingdom

[21] Appl. No.: 09/117,111
[22] PCT Filed: Jun. 19, 1998
[86] PCT No.: PCT/GB98/01799
   § 371 Date: Jul. 23, 1998
   § 102(e) Date: Jul. 23, 1998
[87] PCT Pub. No.: WO99/05805
   PCT Pub. Date: Feb. 4, 1999

[30] Foreign Application Priority Data

Jul. 22, 1997  [EP]  European Pat. Off. .............. 97305486

[51] Int. Cl.[7] .......................... H04B 10/00; H04B 10/16; H04B 10/18
[52] U.S. Cl. ............................. 359/173; 359/161
[58] Field of Search ..................... 359/173, 161

[56] References Cited

U.S. PATENT DOCUMENTS 5,365,362  11/1994  Gnauck ................................... 359/174

OTHER PUBLICATIONS

Laming, Richard I. et al., "Transmission of 6 ps Linear Pulses Over 50 km of Standard . . . ", IEEE Journal of Quantum Electronics, vol. 30, No. 9, Sep. 1, 1994, pp. 2114–2119.

Marcenac, D.D. et al., "40Gbit/s Transmission Over 406km of NDSF Using Mid–Span . . . ", Electronics Letters, vol. 33, No. 10, May 8, 1997, pp. 879–880.

Royset, A. et al., "Linear and Nonlinear Dispersion Compensation . . . ", IEEE Photonics Technology Letters, vol. 8, No. 3, Mar. 1, 1996, pp. 449–451.

*Primary Examiner*—Jason Chan
*Assistant Examiner*—Agustin Bello
*Attorney, Agent, or Firm*—Nixon & Vanderhye P.C.

[57] ABSTRACT

Mid-span spectral inversion (MSSI) is a known method of reducing dispersion in optical transmission systems. In the present invention there is provided a method of symmetrised MSSI, where the high power regions in the optical communication system are symmetrised about the MSSI means.

14 Claims, 9 Drawing Sheets

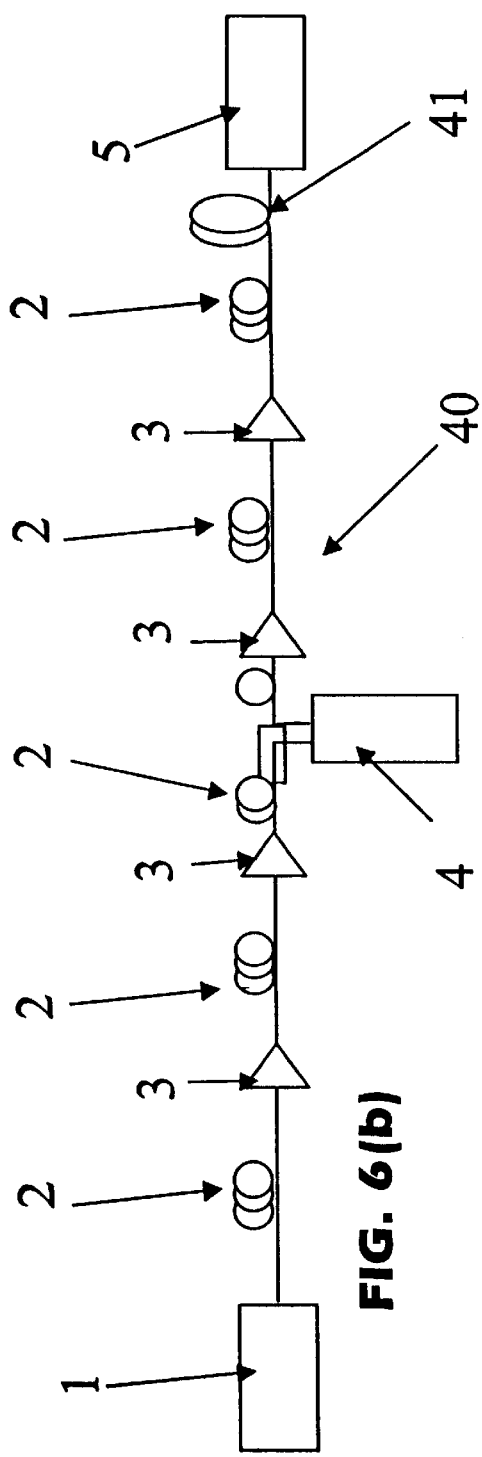
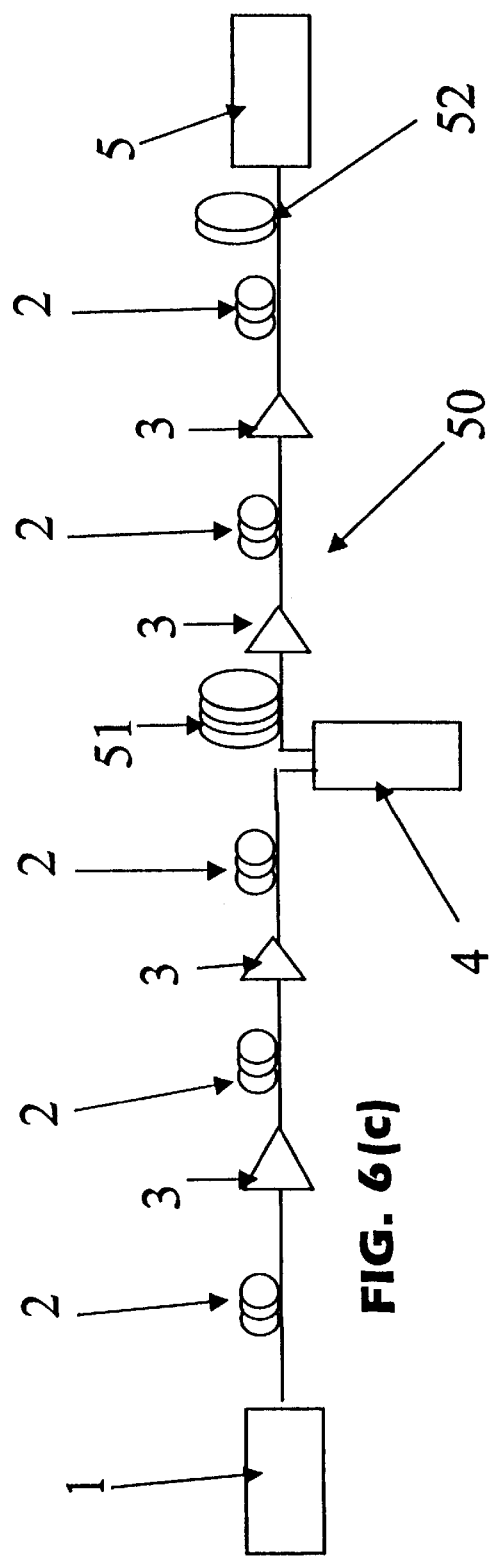
FIG. 6(b)
FIG. 6(c)

OPTICAL TRANSMISSION SYSTEMS USING SPECTRAL INVERSION FOR DISPERSION AND NON-LINEARITIES COMPENSATION

This invention relates to optical transmission systems and to methods of compensating for dispersion and non-linear effects in such links.

It is now widely accepted that optical fibre transmission systems represent the most likely future for telecommunications networks. Optical fibre is now in use in all sectors of telecommunications networks, for example in the TAT-12 trans-Atlantic cable and in core networks that interconnect cities. Optical fibre is even being deployed in the "local loop" as high bandwidth services such as ISDN and video on demand are being supplied to small businesses and residential customers. The primary advantage of optical fibre transmission systems over copper, coaxial, radio and satellite transmission systems is the combination of low attenuation (approximately 0.2 dBkm$^{-1}$) and colossal bandwidth (theoretically hundreds of terahertz, with tens of gigahertz currently achievable). Unfortunately in standard telecommunications optical fibres the transmission window (centred on 1550 nm) that offers low attenuation has high dispersion, and the transmission window (centred on 1310 nm) that has zero dispersion also has relatively high attenuation. The combination of optical fibre transmission systems with optical amplifiers, e.g. erbium doped fibre amplifiers with the 1550 nm transmission window, has enabled the maximum span of optical fibre links to be greatly increased but has only replaced attenuation with dispersion as the limiting factor to the performance of 1550 nm optical fibre transmission systems.

When an optical pulse of nominal wavelength $\lambda_0$ is launched into an optical fibre it will occupy a range of wavelengths defined by $\lambda_0 \pm \delta\lambda$. This can also be regarded as an optical signal with an angular frequency defined by the range $\omega_0 \pm \delta\omega$. As the optical signal propagates along the length of the fibre the optical pulse undergoes dispersion, leading to a broadening of the optical pulse. The pulse now occupies a range of wavelengths defined by $\lambda_0 \pm \Delta\lambda$ (or $\omega_0 \pm \Delta\omega$ in the frequency domain), which is greater than $\lambda_0 \pm \delta\lambda$. In optical fibre transmission systems adjacent bit pulses representing "ones" or "zeroes" may broaden until they begin to overlap, leading to inter symbol interference (ISI). As the level of ISI at a receiver increases, the bit error rate will increase accordingly due to the difficulty of interpreting the overlapping pulses.

The electrical field that constitutes the optical pulse can be described by $$E_z = E(z,t) \exp[j(\omega_0 t - k_o z)] \quad [1]$$

where $E(z,t)$ is the optical pulse envelope and $k_0$ the propagation constant along the z-axis, which runs parallel to the length of the fibre. The development of the optical pulse envelope is governed by Schröndinger's non-linear equation $$\frac{\partial E}{\partial z} + j\frac{\beta_2}{2}\frac{\partial^2 E}{\partial t^2} = j\gamma|E|^2 E - \frac{\alpha}{2}E + g(z)E \quad [2]$$

where $\beta_2$ is the group velocity dispersion, which is dependent on the wavelength of the signal, $\gamma$ is the non-linear effect coefficient, $\alpha$ is the linear attenuation of the fibre and $g(z)$ represents the amplification necessary to compensate for this attenuation.

The second term on the left-hand side of equation [2] determines the dispersion that affects the optical pulse. The first term on the right-hand side of equation [2] determines the extent of non-linear effects that will affect the transmission of the optical pulse, with the non-linear effect coefficient $\gamma$ being given by $$\gamma = \frac{\omega_0 n_2}{c A_{\text{eff}}} \quad [3]$$

where $n_2$ is the non-linear index and $A_{\text{eff}}$ is the effective cross-section of the optical fibre. The second term on the right-hand side of equation [2] represents the absorption of the optical signal along the length of the fibre and the third term on the right-hand side of equation [2] represents the signal amplification necessary to compensate for this attenuation with $g(z)$ given by $$g(z) = \sum_k \frac{1}{2}\ln(G_k)\delta\{z - z_k\} \quad [4]$$

where $z_k$ is the position of the k-th amplifier and $G_k$ is its power gain. Thus, it can be seen from equation [2] that the loss of power in the optical fibre due to attenuation can be overcome by the suitable use of amplifiers, for example optical fibre amplifiers. The use of such amplifiers merely replaces attenuation with dispersion as the factor that sets the upper limit to the performance of optical fibre transmission systems.

Various schemes have been proposed to compensate for the dispersion of signals in optical fibres, especially for optical fibre networks that are already installed and for which it is desirable to increase the capacity of the network by upgrading the terminal equipment. One solution is to insert lengths of specially designed optical fibre that has a very large dispersion, but with the opposite sense to the dispersion of standard telecommunications optical fibre. Thus, when a suitable length of this dispersion compensating fibre is placed at the end of a fibre communications link, the signal dispersion that has been developed along the length of the link is compensated for, enabling the signals to be successfully detected and demodulated. A consequence of the design of the dispersion compensating fibre is that it has a relatively high attenuation, for example 1.5–2.5 dB km$^{-1}$, and thus the use of a substantial length of dispersion compensating fibre may necessitate the use of a further optical amplifier to compensate for the losses caused by the dispersion compensating fibre.

Another technique that can be used for reducing dispersion is the use of dispersion compensating Bragg fibre gratings. These Bragg fibre gratings are formed within optical fibres and reflect some of the light that propagates along the fibre. The Bragg fibre grating is designed so that the reflection of the broadened light pulse depends upon the extent of the pulse broadening. The original pulse with a bandwidth of $\lambda_0 \pm \delta\lambda$ has become a widened pulse with a bandwidth of $\lambda_0 \pm \Delta\lambda$ and the Bragg fibre grating reflects light of different wavelengths at different points along its length. The Bragg fibre grating is designed such that the longer wavelengths (i.e. between $\lambda_0$ and $\lambda_0 \pm \Delta\lambda$), which travel fastest, are reflected deep within the grating and the shorter wavelengths (between $\lambda_0 - \Delta\lambda$ and $\lambda_0$) are reflected nearer to the start of the grating. The effect of this is that the longer wavelength components of the light pulse are forced to propagate along part of the length of the grating before being reflected by the grating and then travelling back along the length of the grating. This "delays" the fastest components of the light pulse, with the length of the delay increasing with the wavelength of the light pulse component, thus causing the light pulse to be compressed in the wavelength domain. If the Bragg fibre grating is suitably designed a broadened pulse with a wavelength of $\lambda_0 \pm \Delta\lambda$ can be compressed so that it is re-formed with a wavelength of $\lambda_0 \pm \delta\lambda$. Bragg fibre gratings do not cause significant optical attenuation and so, unlike dispersion compensating fibre, there is no need to incorporate additional amplification. However, some form of circulator or filter is required so that the broadened optical pulse that enters the Bragg fibre grating can be separated from the compressed optical pulse that is generated by the Bragg fibre grating.

A further technique that can be used to compensate for dispersion in optical fibre communication networks is mid-span spectral inversion (MSSI). For both dispersion compensating optical fibre and dispersion compensating Bragg fibre gratings, dispersion compensation must be applied at periodic intervals in order to prevent the maximum value of dispersion from exceeding a certain limit. So for transoceanic systems, for example, dispersion compensation will be applied typically after every 50–100 km. However MSSI is only performed once, at the mid-span point of the optical fibre link. An example of the use of MSSI is given by M. C. Tatham et al, "Transmission of 10 Gbit s$^{-1}$ directly modulated DFB signals over 200 km standard fibre using mid-span spectral inversion", Electronics Letters, volume 30, number 16, pages 1335–1336. An amplified optical signal is transmitted over 100 km of fibre before it is again amplified and then filtered. The optical signal beam is combined in a semiconductor optical amplifier with a pump beam and four-wave mixing then occurs, creating a phase-conjugate signal beam. The input signal beam and the pump beam are filtered out, so that the output of the semiconductor optical amplifier is the phase-conjugate input signal beam, the spectrum of which is the inverse of the input signal beam.

MSSI thus reverses the sense of the dispersion at the mid-point of the link so that negative dispersion that has built up in the first section of the link becomes positive dispersion and this positive dispersion is counteracted by the negative dispersion that will build up along the second section of the link so that the cumulative dispersion at the receiver, which is sited at the end of the link, is minimal. In the example given above a 10 Gbit s$^{-1}$ signal was successfully transmitted over 200 km of standard optical fibre. If MSSI were not deployed in the link, dispersion would have limited the maximum transmission distance to less than 10 km. MSSI only works if the assumption that the dispersion in the first half of the transmission link is identical, or similar, to the dispersion in the second half of the transmission link holds true.

According to a first aspect of the invention there is provided an optical fibre transmission system comprising an optical transmitter, more than one optical fibre length, at least one optical amplifier, an optical receiver and mid-span spectral inversion means configured such that the optical transmitter launches an optical signal into a first optical fibre length which is optically coupled to subsequent optical fibre lengths the or each optical amplifier is located intermediate successive optical fibre lengths, the mid span spectral inversion means is located at substantially the mid-point of the optical fibre transmission system and the optical receiver receives a transmitted optical signal from the last optical fibre length and characterised in that the spacing, $L_A$, between the optical amplifier preceding the mid span spectral inversion means and the mid span spectral inversion means is substantially $$L_A = \frac{L_{amp} + L_o}{2}$$

and the spacing, $L_B$, between the mid span spectral inversion means and the subsequent optical amplifier is substantially $$L_B = \frac{L_{amp} - L_o}{2}$$

where $L_{amp}$ is substantially the mean optical amplifier spacing and $L_o$ is substantially the overlap length, $\phi_0 l_i$. Alternatively, $L_o$ is substantially the effective non-linear length, $L_{eff}$. Preferably the mid-span spectral inversion means comprises a semiconductor optical amplifier. Further preferably the optical amplifiers are fibre amplifiers. In a particularly preferred embodiment the fibre amplifiers are erbium-doped fibre amplifiers and the optical transmitter and optical receiver both operate at a wavelength of substantially 1550 nm. In a further embodiment the fibre amplifiers are erbium-doped fibre amplifiers and the optical transmitter and optical receiver both operate using wavelength division multiplexing, with the wavelengths used being contained in the window 1450 nm–1650 nm.

According to a second aspect of the invention there is provided a method of compensating for dispersion and non-linear transmission effects in an optical transmission link, the method comprising the step of locating optical amplifiers in said optical transmission link such that the spacing, $L_A$, between the optical amplifier preceding the mid span spectral inversion means and the mid span spectral inversion means is substantially $$L_A = \frac{L_{amp} + L_o}{2}$$

and the spacing, $L_B$, between the mid span spectral inversion means and the subsequent optical amplifier is substantially $$L_B = \frac{L_{amp} - L_o}{2}$$

where $L_{amp}$ is substantially the mean optical amplifier spacing and $L_o$ is substantially the overlap length, $\phi_0 l_i$. Alternatively $L_o$ is substantially the effective non-linear length, $L_{eff}$. Preferably the mid-span spectral inversion means comprises a semiconductor optical amplifier. Additionally the optical amplifiers are fibre amplifiers. Further preferably the fibre amplifiers are erbium-doped fibre amplifiers and the optical transmitter and optical receiver both operate at a wavelength of substantially 1550 nm. In a further embodiment the fibre amplifiers are erbium-doped fibre amplifiers and the optical transmitter and optical receiver both operate using wavelength division multiplexing, with the wavelengths used being contained in the window 1450 nm–1650 nm.

According to a third aspect of the invention there is provided a method of designing a optical transmission link the method comprising the step of locating optical amplifiers in said optical transmission link such that the spacing, $L_A$, between the optical amplifier preceding the mid span spectral inversion means and the mid span spectral inversion means is substantially $$L_A = \frac{L_{amp} + L_o}{2}$$

and the spacing, $L_B$, between the mid span spectral inversion means and the subsequent optical amplifier is substantially $$L_B = \frac{L_{amp} - L_o}{2}$$

where $L_{amp}$ is substantially the mean optical amplifier spacing and $L_o$ is substantially the overlap length, $\phi_0 l_i$. Additionally $L_o$ is substantially the effective non-linear length, $L_{eff}$. Alternatively, the mid-span spectral inversion means comprises a semiconductor optical amplifier. Preferably the optical amplifiers are fibre amplifiers. It is further preferred that the fibre amplifiers are erbium-doped fibre amplifiers and the optical transmitter and optical receiver both operate at a wavelength of substantially 1550 nm. It is still further preferred that the fibre amplifiers are erbium-doped fibre amplifiers and the optical transmitter and optical receiver both operate using wavelength division multiplexing, with the wavelengths used being contained in the window 1450 nm–1650 nm.

According to a fourth aspect of the invention there is provided a method of upgrading an optical transmission link the method comprising the step of locating optical amplifiers in said optical transmission link such that the spacing, $L_A$, between the optical amplifier preceding the mid span spectral inversion means and the mid span spectral inversion means is substantially $$L_A = \frac{L_{amp} + L_o}{2}$$

and the spacing, $L_B$, between the mid span spectral inversion means and the subsequent optical amplifier is substantially $$L_B = \frac{L_{amp} - L_o}{2}$$

where $L_{amp}$ is substantially the mean optical amplifier spacing and $L_o$ is substantially the overlap length, $\phi_0 l_i$. Alternatively $L_o$ is substantially the effective non-linear length, $L_{eff}$. Additionally the mid-span spectral inversion means comprises a semiconductor optical amplifier. Preferably the optical amplifiers are fibre amplifiers. Further preferably the fibre amplifiers are erbium-doped fibre amplifiers and the optical transmitter and optical receiver both operate at a wavelength of substantially 1550 nm. In a further embodiment the fibre amplifiers are erbium-doped fibre amplifiers and the optical transmitter and optical receiver both operate using wavelength division multiplexing, with the wavelengths used being contained in the window 1450 nm–1650 nm.

The invention will now be described, by way of example only, with reference to the following drawings in which:

FIG. 6(b) is a schematic depiction of the optical communications network shown in FIG. 6(a) adapted to include a first solution to the problem of dispersion compensation using the symmetrised MSSI method according to the present invention;

FIG. 6(c) is a schematic depiction of the optical communications network shown in FIG. 6(a) adapted to include a second solution to the problem of dispersion compensation using the symmetrised MSSI method according to the present invention;

Figure 1:
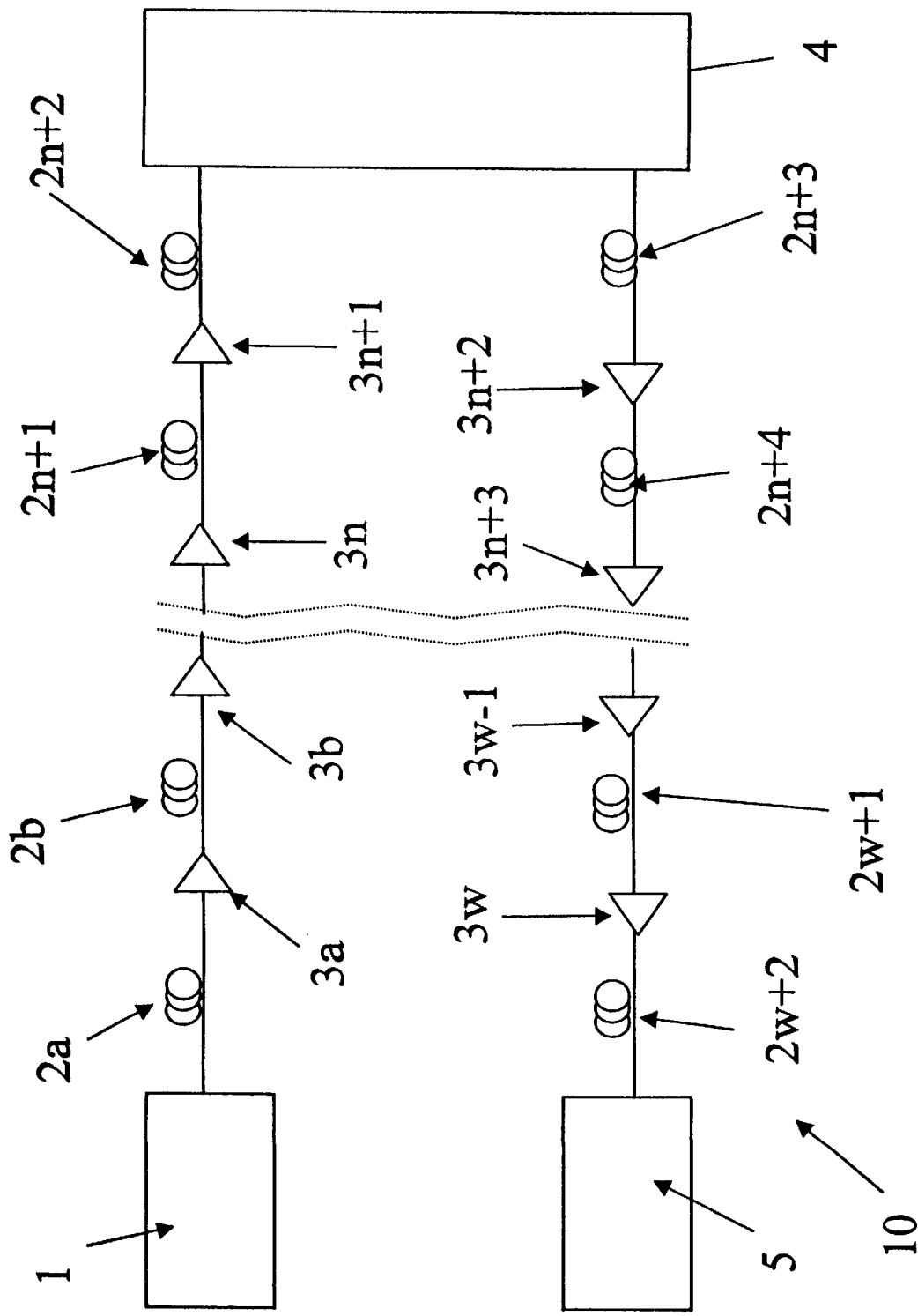
FIG. 1 is a schematic depiction of a long distance optical fibre communications network which utilises MSSI according to the prior art.

FIG. 1 is a schematic depiction of a long distance optical fibre communications network which utilises MSSI according to the prior art. The network comprises optical transmitter 1, optical fibre lengths 2a, 2b, 2c, . . . , optical amplifiers 3a, 3b, . . . , optical phase conjugator 4 and optical receiver 5. The spacing between successive optical amplifiers 3i and 3j that are sited between the transmitter 1 and the phase conjugator 4 is $L_\alpha$ and the spacing between successive optical amplifiers 3i and 3j that are sited between the phase conjugator 4 and the receiver 5 is $L_\beta$. Because one of the effects of the four-wave mixing that occurs in the phase conjugator is to shift the central wavelength of the signal beam and the dispersion of the signal is wavelength dependent, the amplifier spacing $L_\alpha$ will not necessarily equal $L_\beta$. For example, in a system with a total length of 2000 km, a transmitter that transmits light with a central wavelength of 1553 nm and a phase conjugator with a pump wavelength of 1550 nm, the phase-conjugated signal beam will have a central wavelength of 1547 nm. The difference in dispersion caused by this wavelength difference means that MSSI should take place at a distance of 987 km from the transmitter and 1013 km from the receiver. It is commonly understood that MSSI equipment is not located at the exact mid-point of the transmission link, but near to that mid-point. Thus if there are 12 amplifiers in each of the two sections of the transmission link (i.e. there are 13 fibre lengths in each of the two sections of the link) then the amplifier spacing $L_\alpha$=75.9 km and the amplifier spacing $L_\beta$=77.9 km. Similarly, if the central wavelength of the transmitter were to be less than the phase conjugator pump wavelength then the central wavelength of the phase-conjugated signal would be greater than the phase conjugator pump wavelength and thus MSSI should take place nearer to the receiver rather then the transmitter. The optical power level will decrease along the length of a fibre length, due to the attenuation of the fibre, until it is boosted at the next optical amplifier. The amplifiers tend to be operated in a saturated state so that the output power of the amplifier is approximately constant if the input power is greater than a threshold value. This ensures that the output power of the various amplifiers in the transmission link are approximately the same. Even if the amplifiers were not operated in a saturated state the difference between $L_\alpha$ and $L_\beta$ is minimal (in the order of a few per cent) and thus there would not be a significant difference in power levels in the different sections of the transmission link. Phase conjugator 4 may also provide optical amplification so that the output of the phase conjugator is at a suitable power level, and this has been assumed in FIG. 1.

The performance of long-distance optical transmission links is affected by non-linear effects, which can not be compensated for. The magnitude of these non-linear effects increases with both the length of the transmission link and the amount of power launched into the fibre. Thus, in order to minimise non-linear effects the launch power is controlled. For example, in the Tatham paper referenced above, the launch power for a 200 kilometre link was limited to 10 dBm in order to minimise non-linear effects. Although limiting launch power is effective for relatively short transmission lengths and relatively low data rates, current trends are towards longer transmission lengths (up to thousands of kilometres) and higher data rates (hundreds of gigabits per second and above) at which point higher launch powers must be used and non-linear effects begin to have a significant, deleterious affect upon transmission performance. Nevertheless, MSSI is still proposed as a means of reducing the problems caused by dispersion.

The following analysis represents a significant advance on the thinking on MSSI. The present invention which has arisen, at least in part, from this analysis gives rise to potentially very significant performance enhancements which appear to have escaped other workers in this field. For MSSI to be fully effective the dispersion in the first section of the transmission link must be equivalent to the dispersion in the second section of the transmission link but in the opposite sense, causing there to be no net dispersion effect. In order to simplify the analysis of an optical transmission system it is convenient to redefine the variables that are used to describe the lengths of the two sections of the transmission link.

Consider the entire transmission link where $L_1$ is the total length of the first section of the transmission link, $L_2$ is the total length of the second section of the transmission link and a position along the length of the transmission link can be given in terms of a variable z, where z is in the range $z=0$ to $z=L_1+L_2$. The MSSI equipment 4 would be sited at the approximate midpoint of the transmission link, where $z=L_1$. Consider two new variables that describe the length of the sections of the transmission link, $x_1$ and $x_2$, where $x_1$ is the normalised length of the first section of the transmission link and $x_2$ is the normalised length of the second section of the transmission link. The functions z, $x_1$ and $x_2$ are related in the following manner: at the s t art of the first section of the transmission link $z=0$ and $x_1=0$; at the mid-point of the transmission link $z=L_1$, $x_1=0$ and $x_2=1$; at the end of the second section of the transmission link $z=L_1+L_2$ and $x_2=0$. The general relationship of these three variables is given in Equation [5];

$$x_1 = \frac{z}{L_1} \qquad x_2 = -\frac{z-(L_1+L_2)}{L_2} \qquad [5]$$

Figure 2:
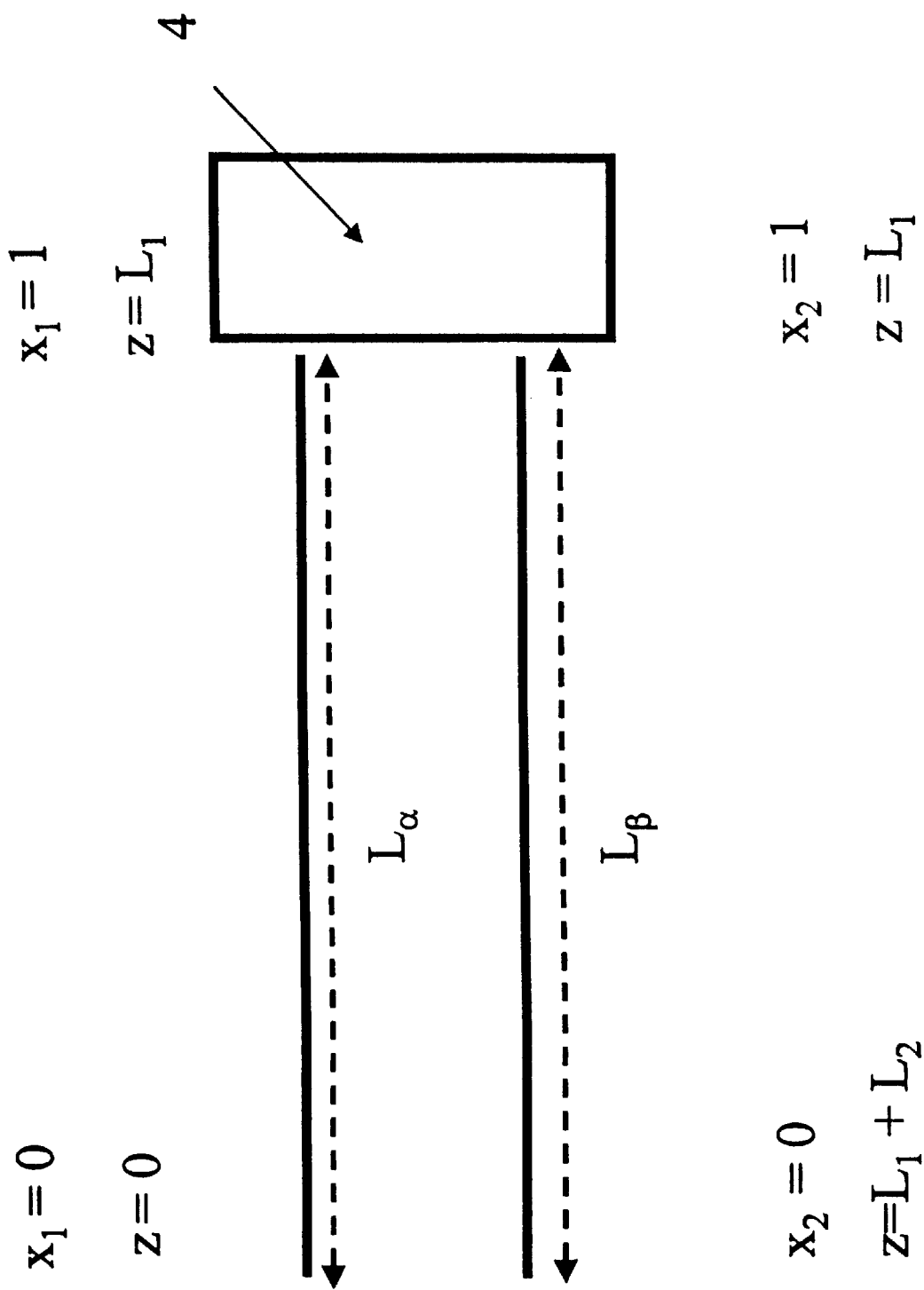
FIG. 2 is a diagrammatic representation of the general form a communications link that utilises MSSI.

These relationships are also shown in FIG. 2. Using these normalised lengths, we obtain the following equations for each of the halves of transmission:

$$\frac{\partial E}{\partial x_1} + j\frac{\beta_{2,1}L_1}{2}\frac{\partial^2 E}{\partial t^2} = j\gamma L_1 |E|^2 E - \frac{\alpha L_1}{2}E + L_1 g_1(x_1 L_1)E \qquad [6]$$

and $$-\frac{\partial E}{\partial x_2} + j\frac{\beta_{2,2}L_2}{2}\frac{\partial^2 E}{\partial t^2} = j\gamma L_2 |E|^2 E - \frac{\alpha L_2}{2}E + L_2 g_2(-x_2 L_2)E \qquad [7]$$

However, when the signal spectrum is inverted, the phase of the signal spectrum is also conjugated, the whole process corresponding to a time conjugation of the signal envelope.

$$E(t)e^{j\omega_1 t} \Leftrightarrow E(\omega_1 + \delta\omega) \qquad [8]$$

Equation [8] shows the relationship between the time domain and the frequency domain for the signal beam before it is inverted or conjugated.

$$E(-t)e^{j\omega_2 t} \Leftrightarrow E_{inv}(\omega_2 - \delta\omega) = E(\omega_1 + \delta\omega) \qquad [9]$$

$$E^*(t)e^{j\omega_2 t} \Leftrightarrow E_{conj}(\omega_2 - \delta\omega) = E^*_{inv}(\omega_2 - \delta\omega) = E^*(\omega_1 + \delta\omega) \qquad [10]$$

Equations [9] and [10] show the time-frequency inter-relationship for, respectively, the signal beam after spectral inversion but without phase conjugation and the signal beam after both spectral inversion and phase conjugation. In order to compare the development of the signal envelope between the first section of the transmission system and the second section of the transmission system, it is necessary to take into account the conjugate of the envelope for the second section of the transmission link, in addition to considering the equation in the reverse direction of propagation, giving $$\frac{\partial E}{\partial x_1} + j\frac{\beta_{2,1}L_1}{2}\frac{\partial^2 E}{\partial t^2} = j\gamma L_1 |E|^2 E - \frac{\alpha L_1}{2}E + L_1 g_1(x_1 L_1)E \qquad [11]$$

$$\frac{\partial E^*}{\partial x_2} + j\frac{\beta_{2,2}L_2}{2}\frac{\partial^2 E^*}{\partial t^2} = j\gamma L_2 |E^*|^2 E^* + \frac{\alpha L_2}{2}E^* - \qquad [12]$$
$$L_2 g_2(-x_2 L_2)E^*$$

The first elements of the two equations are therefore equal if $$\beta_{2,1}L_1 = \beta_{2,2}L_2 \qquad [13]$$

If there were only dispersion effects, they could be fully compensated for by the MSSI method by adjusting the length of the second section of the transmission link ($L_2$). However, there are also non-linear effects which must be accounted for. If the dispersion term is written as $\delta/2$, equations [11] and [12] become $$\frac{\partial E}{\partial x_1} + j\frac{\delta}{2}\frac{\partial^2 E}{\partial t^2} = j\gamma L_1 |E|^2 E - \frac{\alpha L_1}{2}E + L_1 g_1(x_1 L_1)E \qquad [14]$$

$$\frac{\partial E^*}{\partial x_2} + j\frac{\delta}{2}\frac{\partial^2 E^*}{\partial t^2} = j\gamma L_2 |E^*|^2 E^* + \frac{\alpha L_2}{2}E^* - L_2 g_2(-x_2 L_2)E^* \qquad [15]$$

The presence of the first and second order partial differential terms in Equations [14[ and [15] imply that the variation of the signal intensity is more significant than the maximum signal intensity. The mean intensity of the signal decreases due to absorption and is increased when the signal passes through one of the amplifiers. The signal envelope can be standardised by means of this mean intensity, such that if $A(x,t)$ is the standardised envelope, then $<|A(x,.)|^2>=1$ regardless of the value of x, where $<|F(x,.)|2>$ is the square of the average value of $F(x,t)$ over all values of t. This standardisation is given by $$E(x_1, t) = A_1(x_1, t)\exp\left(\frac{-\alpha L_1 x_1}{2}\right)\sqrt{P_1}\prod_{x_{1,k}<x_1} G_{1,k} \qquad [16]$$

$$E^*(x_2, t) = A_2^*(x_2, t)\exp\left(\frac{\alpha L_2(x_2 - 1)}{2}\right)\sqrt{P_2}\prod_{x_{2,k}\geq x_2} G_{2,k} \qquad [17]$$

If equations [16] and [17] are substituted into equations [14] and [15] respectively then $$\frac{\partial A_1}{\partial x_1} + j\frac{\delta}{2}\frac{\partial^2 A_1}{\partial t^2} = jf_1 x_1 |A_1|^2 A_1 \qquad [18]$$

$$\frac{\partial A_2^*}{\partial x_2} + j\frac{\delta}{2}\frac{\partial^2 A_2^*}{\partial t^2} = jf_2 x_2 |A_2^*|^2 A_2^* \qquad [19]$$

where $f_1$ and $f_2$ are given by $$f_1(x_1) = \gamma L_1 P_1 \times \exp(-\alpha L_1 x_1) \times \prod_{x_{1,p}<x_1} G_{1,p} \qquad [20]$$

$$f_2(x_2) = \gamma L_2 P_2 \times \exp(-\alpha L_2(x_1 - 1)) \times \prod_{x_{2,p}\geq x_{21}} G_{2,p} \qquad [21]$$

and where $A_2^*$ is the conjugate of $A_2$, and $P_1$ and $P_2$ are the optical powers in the first and second sections of the network respectively. $f_1$ and $f_2$ are functions that will be referred to as the transmission functions as they represent the combination of the transmission effects (i.e. non-linear effects, amplification and attenuation) that occur in, respectively, the first section and the second section of the transmission link. In order that the propagation effects are entirely compensated for by MSSI, it is necessary that the combination of non-linear effects, attenuation effects and amplification effects are equal in each half of the transmission link, i.e. that $f_1=f_2$. This is impossible in the normal case due to absorption in the fibres. However, this does apply in three cases: where there are no non-linear effects (i.e. $\gamma=0$), where there is no attenuation or in the case of distributed amplification. In the third case, the variation in optical power along each of the fibres is the same, giving $$f_1(x_1)=\gamma L_1 P_1 \qquad [22]$$

and similarly $$f_2(x_2)=\gamma L_2 P_2 \qquad [23]$$

We therefore have $f_1=f_2$ only if $L_1 P_1=L_2 P_2$. However, it is assumed that $\gamma$ is constant and has the same value in the two halves of transmission. If its value is different in the two halves, then in order for full compensation of the propagation effects $$\gamma_1 L_1 P_1=\gamma_2 L_2 P_2 \qquad [24]$$

must hold true. In the normal case if standard telecommunications fibres are used then $f_1 \neq f_2$ due to the absorption in the fibres. Equations [18] and [19] show the parallel in the development of the signal, $A_1$ or $A_2^*$, from one end of the transmission system up to the mid-point of the transmission system, where the spectral inversion is performed. A difference appears in the non-linear term due to the inequality $f_1 \neq f_2$. The difference between these two functions can be written as $\Delta f$, and the difference between $A_1(x,t)$ and $A_2^*(x,t)$ as $a(x,t)$ where $$f_1=f \quad f_2=f+\Delta f \qquad [25]$$

$$A_1=A \quad A_2^*=A+a \qquad [26]$$

Since $A_1(x,t)=A_2^*(x,t)$ for $x=1$ (i.e. at the point where the spectral inversion is performed), we have $a(1,t)=0$ for any value of t. The function $a(0,t)$ represents the distortions in the final signal at the receiver with respect to the initial signal, and these distortions are due to propagation effects that are not compensated for by the spectral inversion. $A_i(x,t)$ is the standardised field, therefore giving $<|A_i(x,.)|^2>=1$. We can therefore advance the hypothesis that the power of the distortions $a(x,t)$ is low, i.e. $<|a(x,.)|^2><<<|A_i(x,.)|^2>=1$. By replacing the field $A_2^*$ in Equation [19] by its expression in Equation [26], and taking account of the fact that $A=A_1$ is the solution to Equation [18], we obtain the following development of the distortions $a(x,t)$ $$\frac{\partial a(x,t)}{\partial x} + j\frac{\delta}{2}\frac{\partial^2 a(x,t)}{\partial t^2} = h(x,t) \qquad [27]$$

$h(x,t)$ can be simplified for the case $<|a(x,.)|^2><<1$ to give $$j\Delta f(x)A(x,t)|^2 A(x,t) \approx h(x,t) \qquad [28]$$

The Fourier transform of Equation [28] gives $$\frac{\partial a(x,\omega)}{\partial x} - j\frac{\delta}{2}\omega^2 a(x,\omega) = H(x,\omega) \qquad [29]$$

If equation [29] is transformed using the following variable change $$a(x,\omega) = b(x,\omega)\exp\left(j\frac{\delta}{2}\omega^2 x\right) \qquad [30]$$

then $$\frac{\partial b(x,\omega)}{\partial x} = H(x,\omega)\exp\left(-j\frac{\delta}{2}\omega^2 x\right) \qquad [31]$$

This makes it possible to raise the development by the modulus of $b(x,\omega)$ which is equal by construction to the modulus of $a(x,\omega)$ (following equation [30]) to give $$\left|\frac{\partial |b(x,\omega)|}{\partial x}\right| \leq \left|\frac{\partial b(x,\omega)}{\partial x}\right| \leq |H(x,\omega)| \qquad [32]$$

Integrating this inequality with regard to x over the range [0,1], and knowing that $b(1,\omega)=0$, we obtain $$|b(0,\omega)| \leq \int_0^1 |H(x,\omega)|dx \qquad [33]$$

However, the Cauchy-Schwarz inequality tells us that if two functions F and G are integrable over the range [0,1], we have $$\left(\int_0^1 F(x)G(x)dx\right)^2 \leq \int_0^1 |F(x)|^2 dx \times \int_0^1 |G(x)|^2 dx \quad [34]$$

By fixing $\omega$ and positing $F(x)=|H(x,\omega)|$ and $G(x)=1$, Equation [33] becomes $$|b(0,\omega)|^2 d\omega \leq \int_0^1 |H(x,\omega)|^2 dx \quad [35]$$

It is now possible to integrate equation [35] with respect to $\omega$ $$\int |b(0,\omega)|^2 d\omega \leq \int \left(\int_0^1 |H(x,\omega)|^2 dx\right) d\omega \quad [36]$$
$$= \int_0^1 \left(\int |H(x,\omega)|^2 d\omega\right) dx$$

If we take the inverse Fourier transform of equation [36], limiting the integration with respect to time to the interval [$-\Delta t/2, \Delta t/2$] over which the signal exists in real terms (in practice, transmission is not indefinite and edge effects are ignored), we obtain, by using the approximation of Equation [281]:

$$\frac{1}{\Delta t}\int_{-\frac{\Delta t}{2}}^{\frac{\Delta t}{2}} |b(0,t)|^2 dt \leq \int_0^1 \left(\frac{1}{\Delta t}\int_{-\frac{\Delta t}{2}}^{\frac{\Delta t}{2}} |h(x,t)|^2 dt\right) dx \quad [37]$$
$$\approx \int_0^1 \Delta f^2(x)\left(\frac{1}{\Delta t}\int_{-\frac{\Delta t}{2}}^{\frac{\Delta t}{2}} |A(x,t)|^6 dt\right) dx$$

We also have $<|A(x,.)|^2>=1$, and we can therefore assume that $|A(x,.)|\approx 1$, and therefore that $|A(x,.)|^6 \approx 1$. In this case, Equation [37] is converted to mean power by means of $$\langle |a(0,t)|^2 \rangle \leq \int_0^1 \Delta f^2(x) dx = \Delta^2 \quad [38]$$

The transition from Equation [37] to Equation [38] is mathematically incorrect since, by using the Cauchy-Schwarz inequality several times and the fact that $<|A(x,.)|^2>=1$, it is possible to show that $<|A(x,.)|^6>\geq 1$. However, this hypothesis $|A(x,.)|\approx 1$ is reasonable in the case of strong dispersion, and should give a good approximation for the estimate of distortion. Equation [38] can, however, be written in a more explicit way. Because the distortion is defined as the divergence between the signal obtained at the end of the transmission link and the signal that was injected into the transmission link, then if $<|a(0,.)|^2>$ represents the standardised power of the distortion at the end of the transmission link and the signal power at the end of the transmission link is normalised, then $$\frac{P_{distortion}}{P_{signal}} \leq \Delta^2 = \int_0^1 \Delta f^2(x) dx \quad [39]$$

where $\Delta$ is the standard divergence between the transmission functions $f_1$ and $f_2$ (which represent the combination of the transmission effects (non-linear effects, attenuation and amplification) in each of the sections of the transmission link). The smaller this divergence, $\Delta$, becomes, the less significant will be the effects of the distortion and the better the performance of the transmission system will be.

It is possible to optimise the performance of the transmission system by minimising the term $\Delta^2$ (i.e. acting to minimise the power of the distortion at the end of the transmission link). In order to successfully model the optimisation of such a transmission system it is necessary to assume that:

(i) the link is composed of standard single-mode fibre, the characteristics of which are assumed to be constant along its length;

(ii) the optical amplifiers are regularly spaced and exactly compensate for the attenuation of the length of fibre preceding them; and (iii) the spectral inversion device is located at approximately the mid-point of the transmission system.

Since the wavelengths before and after spectral inversion are different (as $\omega_1 \approx \omega_2$), the lengths of the two sections of the transmission system are slightly different (i.e. $L_1 \neq L_2$). Since the aim is to achieve symmetry between the two sections, in order to obtain the condition $f_1 = f_2$ (i.e. that the combination of transmission effects in the first section of the transmission link are equal to the combination of transmission effects in the second section of the transmission link), the relationship between the spacing between amplifiers within the first section of the transmission link and the length of that section of the transmission system must be constant. The relationship for the spacing between amplifiers in the first section of the transmission link can be defined as $l_1=\eta L_1$ and similarly the spacing between amplifiers in the second section of the transmission link can be defined as $l_2=\eta L_2$. The positioning of the amplifiers in the second section of the transmission network is independent from the positioning of the amplifiers in the first section of the transmission network. The shift between the positionings of the amplifiers can be defined as $\phi\eta$.

Using this model of the transmission link and the assumptions made above, the functions $f_1$ and $f_2$ (for which we wish to minimise $\Delta^2$, the difference between the two transmission functions) are periodic functions, with a period of $\eta$. The profiles of these functions over their first period $[0,\eta]$ are shown in FIG. 2 and are described by Equations [40] and [41];

$$f_1(x)=\gamma L_1 P_1 \exp(-\alpha' L_1 x) \quad [40]$$

$$f_2(x)=\gamma L_2 P_2 \exp(\alpha' L_2 x)\exp(\alpha' L_2 \eta\phi)\exp(\alpha' L_2 \eta\epsilon) \quad [41]$$

for $0\leq x\leq\eta$ with $\epsilon=0$ if $0\leq x\leq\eta\phi$ and $\epsilon=1$ if $\eta\phi\leq\xi\leq\eta$. $\alpha'$ represents the attenuation of the fibre, but expressed in Nepers km$^{-1}$. The conversion between $\alpha'$ and $\alpha$, with the more usual units of dB km$^{-1}$, is given by $$\alpha' = \frac{\log_e(10)}{10}\alpha \quad [42]$$

As the functions $f_1$ and $f_2$ are periodic, equation [39] can be written as follows, ignoring edge effects:

$$\Delta^2 = \int_0^1 \Delta f^2(x) dx = \frac{1}{\eta}\int_0^\eta \Delta f^2(x) dx \quad [43]$$

Since the functions $f_1$ and $f_2$ are expressed with the aid of exponential functions, integration can be carried out without difficulty. This gives $$\Delta^2 = \frac{\gamma^2 L_1 L_2}{2\alpha'} \left[ \frac{P_1^2}{I_2}\left(1 - e^{-2\alpha' I_1}\right) + \frac{P_2^2}{I_1}\left(1 - e^{-2\alpha' I_2}\right) - \right. \quad [44]$$
$$\left. \frac{4P_1 P_2}{I_2 - I_1}\left(e^{-\alpha' I_1 \varphi}\left(1 - e^{-\alpha' I_2}\right) - e^{-\alpha' I_2 \varphi}\left(1 - e^{-\alpha' I_1}\right)\right) \right]$$

The powers $P_1$ and $P_2$ are adjustable. However, they cannot be too low in practice if the amplified spontaneous emission (ASE) generated in the amplifiers is not to have too significant an effect upon the system. Let us consider the mean power level, $P_0$ as a statement of the problem. $P_0$ is given by $$P_0 = \frac{P_1 + P_2}{2} \quad [45]$$

where $P_1$ is the maximum optical power in the first section of the transmission link and $P_2$ is the maximum optical power in the second section of the transmission link. In most systems there will be very little difference between $P_1$ and $P_2$. The parameter which can be varied is the relative difference, $\rho$, between the powers $P_1$, $P_2$ and $P_0$. This can be defined as $$P_1 = P_0(1+\rho) \quad [46]$$

$$P_2 = P_0(1-\rho) \quad [47]$$

Equation [44] can now be rewritten as $$\Delta^2 = K\left[\frac{(1+\rho)^2}{I_2}\left(1 - e^{-2\alpha' I_1}\right) + \frac{(1-\rho)^2}{I_1}\left(1 - e^{-2\alpha' I_2}\right) - \right. \quad [48]$$
$$\left. \frac{4(1-\rho^2)}{I_2 - I_1}\left(e^{-\alpha' I_1 \varphi}\left(1 - e^{-\alpha' I_2}\right) - e^{-\alpha' I_2 \varphi}\left(1 - e^{-\alpha' I_1}\right)\right)\right]$$

with $$K = \frac{\gamma^2 P_0^2 (L^1 - \Delta L^2)}{8\alpha'} \quad [49]$$

The only parameters that we can modify are $\phi$ (which is a measure of the shift in amplifier spacing between the first section and the second section of the transmission link) and $\rho$ (which represents the difference between the optical power in the first section and the second section of the transmission link). Equation [48], which is an expression of $\Delta^2$, can be differentiated in order to gain an expression for an optimum value of $\phi$ (i.e. $\phi_0$) that is independent of $\rho$:

$$\varphi_0 = \frac{1}{\alpha(I_2 - I_1)} \ln\left(\frac{I_2(1 - e^{-\alpha' I_1})}{I_1(1 - e^{-\alpha' I_2})}\right) \quad [50]$$

This optimum value $\phi_0$ can then be inserted into the expression of $\Delta^2$ (Equation [48]) to give $$\Delta_{\varphi_0}^2 = K\left[\frac{(1+\rho)^2}{I_2}\left(1 - e^{-2\alpha' I_1}\right) + \frac{(1+\rho)^2}{I_1}\left(1 - e^{-2\alpha' I_2}\right) - \right. \quad [51]$$
$$\left. \frac{4(1-\rho^2)}{I_1} e^{-\alpha' I_2 \varphi_0}\left(1 - e^{-\alpha' I_1}\right)\right]$$

This allows the optimum value of $\rho$ to be found $$\rho_0 = \frac{I_2(1 - e^{-2\alpha' I_1}) - I_1(1 - e^{-2\alpha' I_2})}{I_2(1 - e^{-2\alpha' I_1}) + I_1(1 - e^{-2\alpha' I_2}) + 4I_2 e^{-\alpha' I_2 \varphi_0}(1 - e^{-\alpha' I_1})} \quad [52]$$

Figure 3:
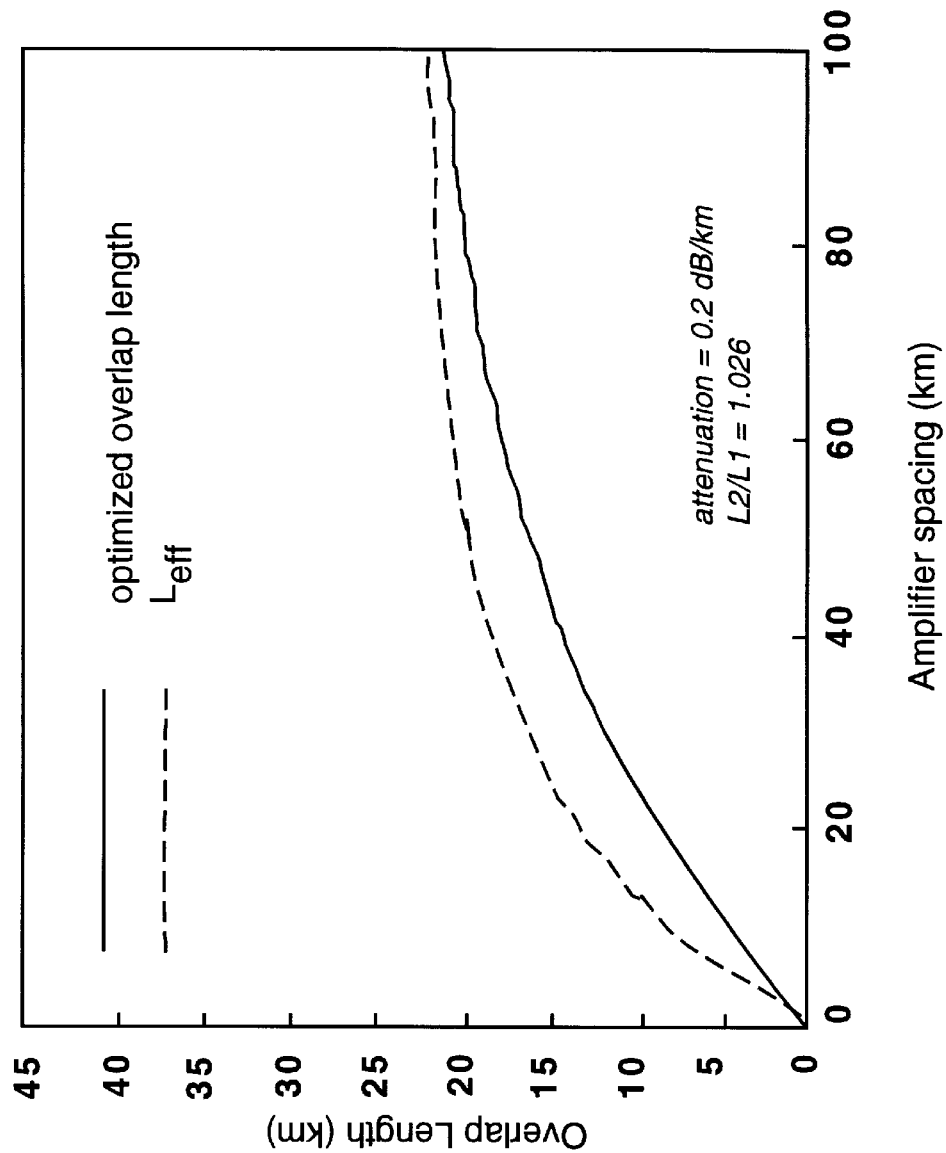
FIG. 3 is a graph showing the relationship between both overlap length and the effective non-linear length of an optical fibre communications network with amplifier spacing.

Thus it can be shown that for large amplifier spacings $\phi_0$ tends towards a zero value but the product $\phi_0 l_i$ tends to a non-zero value, very close to $1/\alpha'$, which is the effective non-linear length for a large propagation length. This length, $\phi_0 l_i$, will be referred to as the overlap length. FIG. 3 shows the variation of the optimum overlap length and the effective non-linear length with different amplifier spacings in each of the two sections of the transmission network (the ratio of $L_1:L_2$ is 1.026). The parameters used are: group velocity dispersion, $D_1 = 17$ ps/km/nm, higher-order dispersion, $\partial D/\partial\lambda_1 = 0.05$ ps km$^{-1}$ nm$^{-2}$, absorption, $\alpha_1 = 0.2$ dB/km (also given by $\alpha' = 0.046$ Nepers km$^{-1}$), wavelength of the initial signal, $\lambda_1 = 1553$ nm and the wavelength of the pump for spectral inversion, $\lambda_2 = 1550$ nm. The effective non-linear length is calculated using $$L_{eff} = \frac{1 - \exp(-\alpha' l)}{\alpha'} \quad [53]$$

As can be seen from FIG. 3, the values of the overlap length and the effective non-linear length ($L_{eff}$) are similar for a given amplifier spacing, with the values of $L_{eff}$ and $L_{overlap}$ converging as the amplifier spacing increases to more practical spacings (i.e. 50–100 km).

The overlap length can be used to define a high-power region in the optical fibre. We have found that if the positioning of the optical amplifiers and of the phase conjugator is suitably controlled then these high-power regions can be arranged so that they are in symmetrical positions about the MSSI equipment. By this we mean that the last amplifier before the MSSI equipment and the first amplifier after the MSSI equipment are arranged so that the distance between the end of the last high-power region before the MSSI equipment and the MSSI equipment is the same as the distance between the MSSI equipment and the start of the first high-power region after the MSSI equipment (see FIG. 4). Similarly, the distance between the start of the last high-power region before the MSSI equipment and the MSSI equipment is the same as the distance between the MSSI equipment and the end of the first high-power region after the MSSI equipment.

Figure 4:
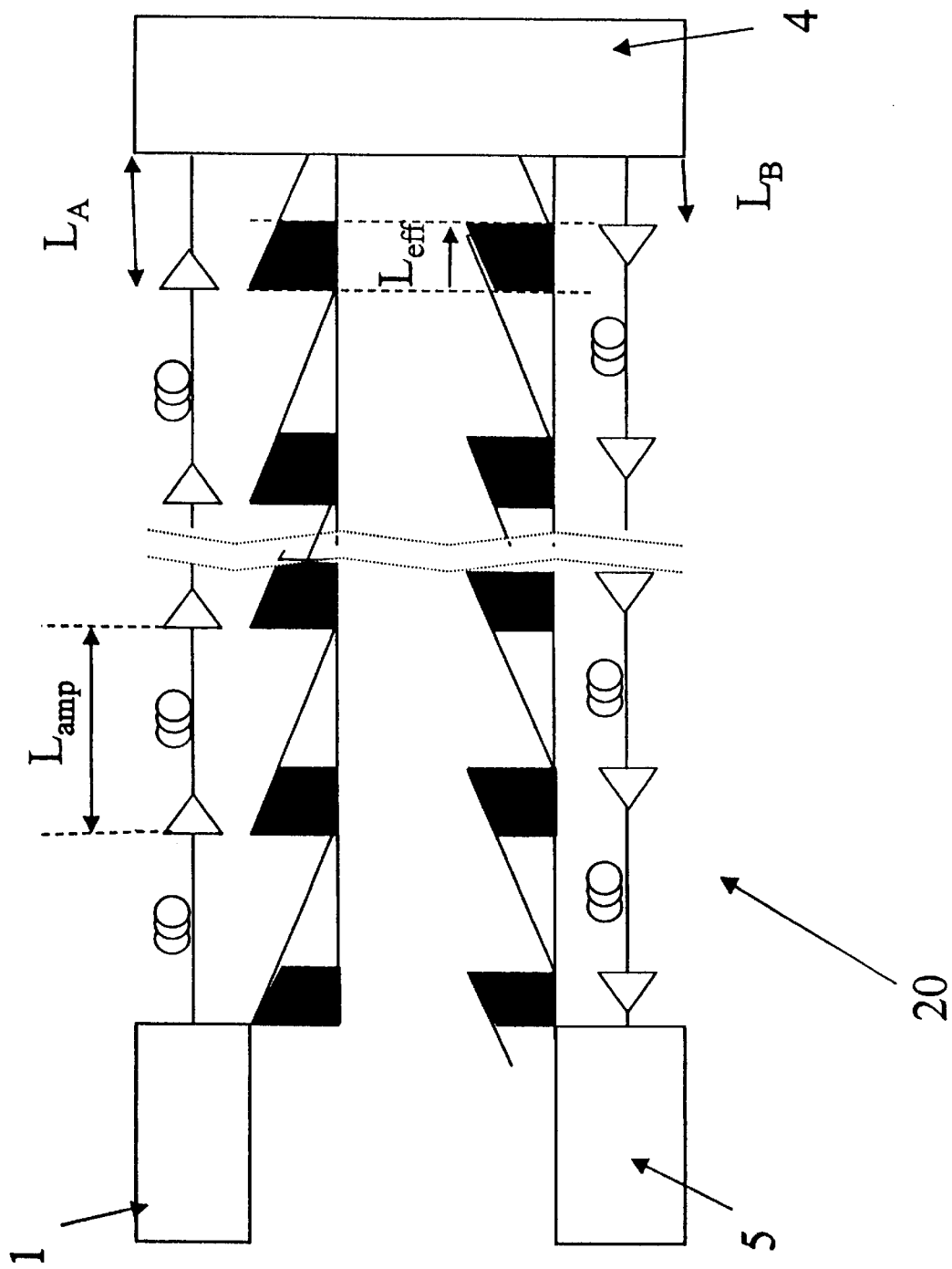
FIG. 4 is a schematic depiction of long distance optical fibre communications network which utilises symmetrised MSSI according to the present invention.

An example of an optical transmission link which has been arranged in such a manner and the optical power distribution along the length of the transmission link is shown in FIG. 4. The transmission link is similar to the link shown in FIG. 1, comprising optical transmitter 1, lengths of optical fibre 2a, 2b, 2c, . . . , optical amplifiers 3a, 3b, . . . , optical phase conjugator 4 and optical receiver 5. High power regions 6a, 6b, 6c, . . . which occur in the fibre lengths immediately after each optical amplifier are also shown. For the sake of clarity some of the labels have not been repeated in FIG. 4. In FIG. 4 the amplifiers are positioned so as to have the high-power regions 6 in the two sections of the transmission link symmetrical about the mid-point of the transmission network, where MSSI is performed. These high-power regions 6 are the length of fibre immediately after the fibre amplifier which is substantially equal to the effective non-linear length of the optical transmission link. This is a term which is in common use in the field of optical transmission systems, see for example "Non-linear optics" by Agrawal, pages xx–yy. For example, following equation [53], in a typical system with an amplifier separation of 80 kilometres and a linear attenuation coefficient, α, of 0.2 dBkm$^{-1}$, the effective non-linear length ($L_{eff}$), and thus the overlap length ($L_{overlap}$), is approximately 21.5 km. The necessary positioning to obtain the symmetrised MSSI is shown in FIG. 4. The distance from the amplifier preceding the phase conjugator to the phase conjugator is $L_A$ and the distance from the phase conjugator to the subsequent amplifier is $L_B$. The distances $L_A$ and $L_B$ are given by Equations [54]:

$$L_A = \frac{L_{amp} + L_{eff}}{2} \qquad L_B = \frac{L_{amp} - L_{eff}}{2} \qquad [54]$$

The amplifier spacing is $L_{amp}$ which is assumed to be constant in both sections of the transmission link. In practice the amplifier spacing in the two sections of the link may be different but as this difference will be quite small, for example 2–3%, it will not have a significant affect on the calculation of $L_A$ and $L_B$ In the above case the power loss over the high-power region is approximately 4 dB, i.e. the power is reduced to 40% of its original value. This should be compared with the power loss over one 80 km optical fibre link which is ≈16 dB below the power level that is launched by an optical amplifier. This corresponds to only 2.5% of the originally launched power.

Figure 5:
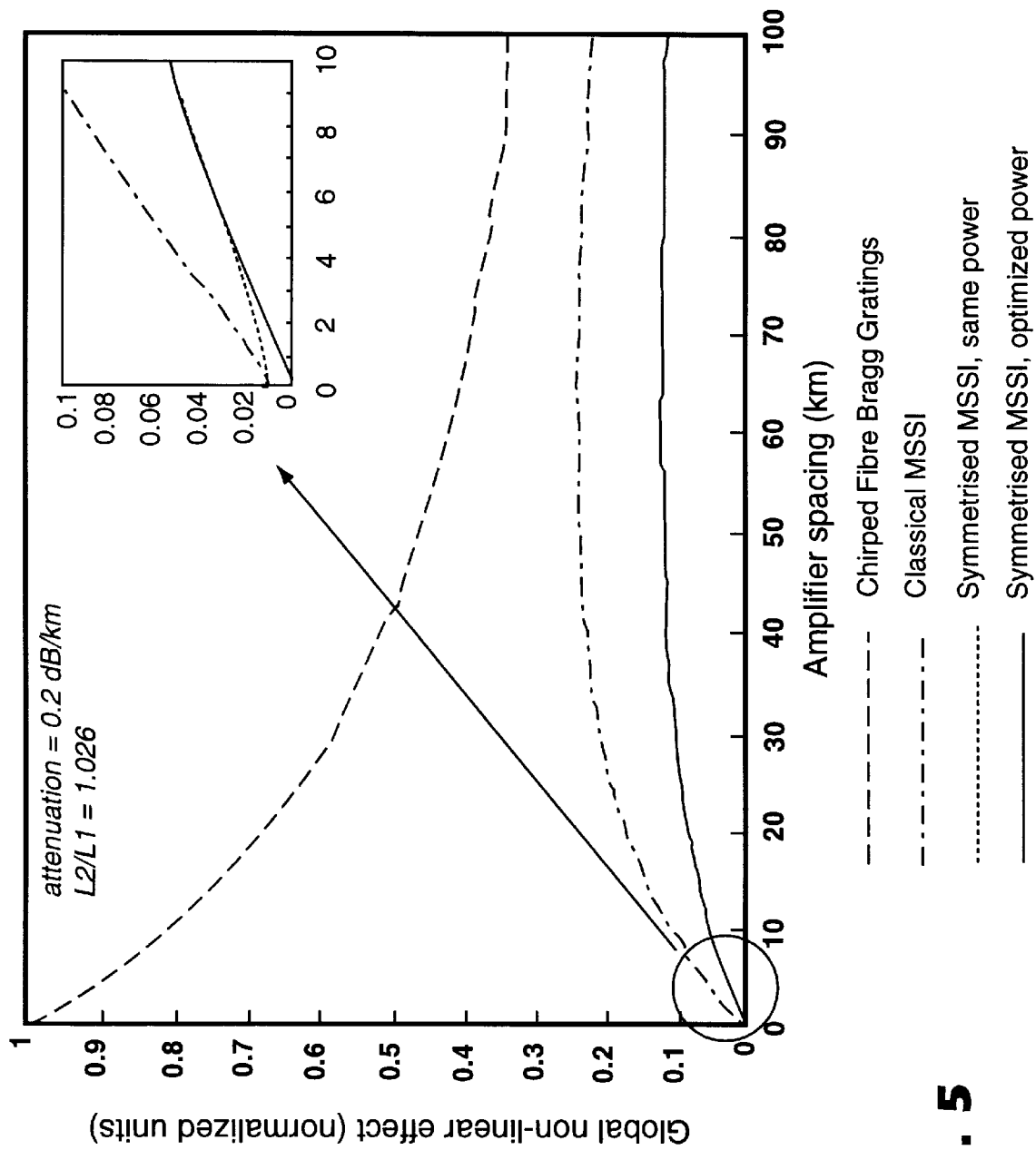
FIG. 5 is a graph showing the relative transmission performance of different dispersion compensation techniques.

FIG. 5 enables us to compare the performance of long distance optical communications systems which utilise different methods of dispersion compensation. It uses the formula of Equation [48] for a conventional MSSI system, optimised MSSI systems following the teaching of the present invention (one featuring optimisation of $\rho_0$ and one without optimisation of $\rho_0$) and dispersion compensating Bragg fibre gratings. Each of the curves represents the normalised amplitude of the propagation effects as a function of the spacing between intermediate amplifiers for a given system. The curve shown by the solid line corresponds to the system using optimised MSSI (where both power and the overlap length are optimised {i.e. $\rho=\rho_0$ and $\phi=\phi_0$}), the curve shown by the dotted line corresponds to a system using symmetrised MSSI (where only the overlap length is optimised {i.e. $\rho=0$, $\phi=\phi_0$}) and the curve shown in dots and dashes corresponds to a system using known, non-optimised MSSI (where $\rho=0$ and $\phi=0$). Lastly, the dashed line corresponds to what is obtained by using a different dispersion compensation system, where the dispersion effects are compensated for by use of Bragg fibre gratings (this does not reduce the magnitude of the non-linear effects).

For small intervals between amplifiers, it can be seen that all the systems using MSSI perform better than the system using Bragg fibres. Optimised MSSI and symmetrised MSSI even succeed in almost completely compensating for all propagation effects, both dispersion and non-linear effects. Optimisation of the parameter ρ is only important for small intervals between amplifiers (i.e. less than 5 km which is not a practical value for real transmission networks). For longer amplifier intervals (i.e. greater than 5 km, which is the case in practice) the curves for optimised MSSI and symmetrised MSSI systems are superimposed, thus it is not worthwhile optimising the parameter ρ, since the gain in transmission performance is negligible. However, for greater amplifier spacings (of the order of 50 to 100 km), it is important to use either optimised or symmetrised MSSI in preference to known MSSI methods or other dispersion compensation methods. In FIG. 5 it can be seen that the final distortion for optimised MSSI and symmetrised MSSI is half of that for non-optimised MSSI (i.e. the power of the distortion decreases by 3 dB), and one-third of that for the system using Bragg fibres (the power of the distortion is decreased by approximately 5 dB). For the systems studied, the formula for raising the power of the final distortion can be written as:

$$\frac{P_{distortion}}{P_{signal}} \leq \frac{\gamma^2 P_0^2 L^2}{4\alpha l} \xi^2 \qquad [55]$$

where γ is the non-linear coefficient of the propagation equation, $P_0$ is the power of the signal injected into the transmission system, L is the total length of the transmission network, α is the absorption coefficient, l is the spacing between amplifiers and ξ is a parameter that indicates the performance of the transmission system. For long intervals between amplifiers (for example, greater than 60 km), $\xi \approx \sqrt{2}$ when using Bragg fibre gratings (Equation [48] must be slightly adapted in this case); $\xi \approx 1$ for non-optimised MSSI (i.e. $\phi=0$) and $\xi \approx 0.5$ for symmetrised (or optimised) MSSI (i.e. $\phi=\phi_0$). Therefore, for a given transmission length L and a given amplifier spacing l, in order to maintain a constant power for the distortion, it is possible to use a launch power of 3 dB higher with optimised MSSI systems with respect to known non-optimised MSSI systems, and 4.5 dB higher with respect to the system using dispersion compensating Bragg fibre gratings.

Figure 6A:
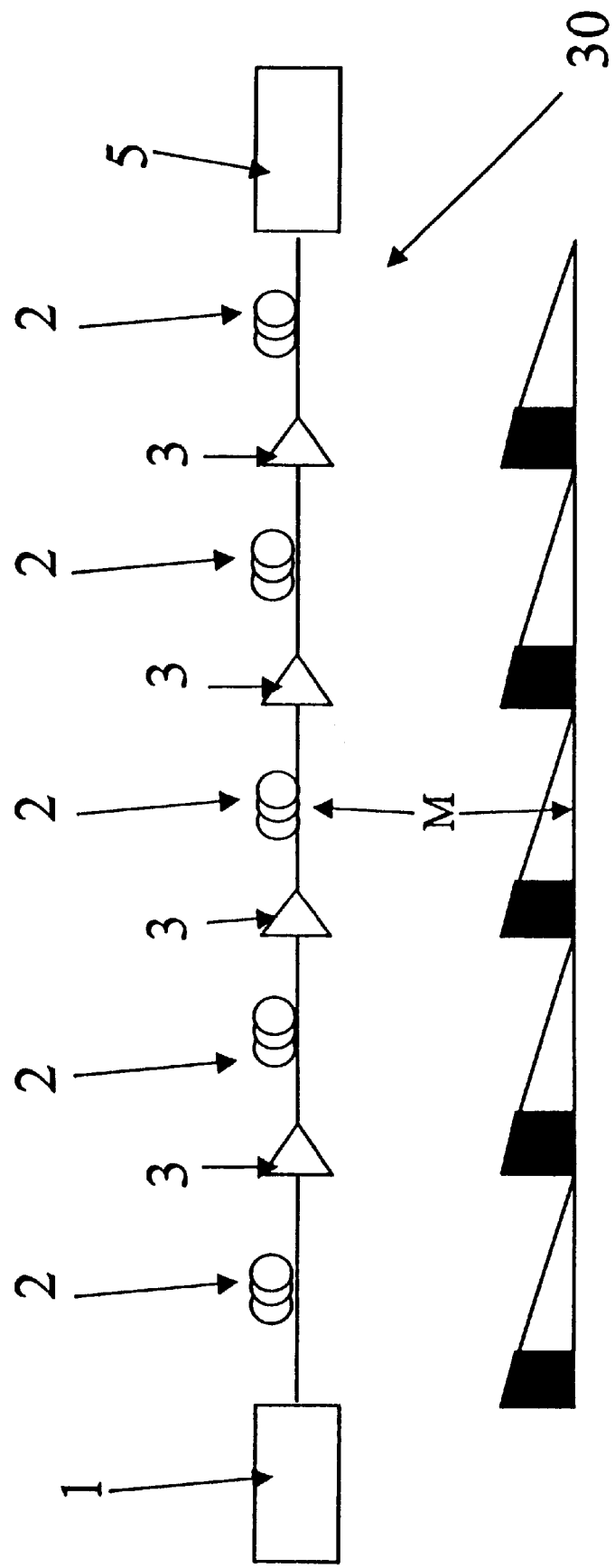
FIG. 6(a) is a schematic depiction of an optical communications network.

The use of symmetrised MSSI will be of great value if existing optical fibre networks using 1550 nm transmission equipment are upgraded, allowing electronic repeaters to be replaced with optical amplifiers and a suitably positioned phase conjugator. It will be understood that the following examples are purely illustrative and do not limit the use of the present invention. FIG. 6(a) depicts a long range optical transmission network 30 with regular amplifier spacings 2 that has an odd number of spans between successive optical amplifiers 3. Clearly the mid-span point of the network M will be intermediate two optical amplifiers. If the network designer is free to place the MSSI equipment 4 anywhere along the length of the network without being constrained by difficulties of accessing the network or providing electrical power, etc. then the solution for providing symmetrised MSSI is shown in FIG. 6(b), where $L_A$ is the distance between the MSSI equipment and the preceding optical amplifier, $L_B$ is the distance between the MSSI equipment and the subsequent optical amplifier, $L_{amp}$ is the spacing between successive amplifiers (i.e. $L_A+L_B=L_{amp}$). In order to have the high-power regions symmetrical about the MSSI equipment it is necessary to add a length of fibre, 41, $L_{eff}$ kilometres long at the receiver end of the network and site the MSSI equipment such that the equations [54] are satisfied. It may also be necessary to include an additional amplifier to compensate for the additional attenuation caused by the extra length of fibre 41. For example, if $L_{amp}$=80 km and α=0.2 dBkm$^{-1}$ then $L_{eff}$=21.5 km. If the network has 9 fibre lengths then the network length would be 720 km, with the addition of the extra length of fibre at the receiver end increasing the length of the network to 741.5 km. The MSSI equipment would be sited in between the fourth and fifth optical amplifiers, at a distance of ≈51 km from the fourth amplifier (i.e. 371 km along the length of the network). If the addition of the extra length of fibre at the receiver end of the network causes the optical power level to decrease such that the bit error rate increases to an unacceptable level then it would be necessary to add a suitable amplifier to boost the optical power just before the receiver. Also it may be necessary to add an additional amplifier in order to maintain the symmetry of the high-power regions about the MSSI equipment.

In real life situations it is not always possible to place the MSSI equipment at a location other than an amplifier site, and this case is shown in FIG. 6(c). The MSSI equipment 4 is located at the amplifier location following the mid-span point of the network 50. In order to have the high-power regions symmetrical about the MSSI equipment it is necessary to add a length of fibre, 52, $L_{eff}$ kilometres long at the receiver end of the network and a length of fibre, 51, $L_{amp}$–$L_{eff}$ kilometres long immediately after the MSSI equipment at the amplifier location. Again assuming $L_{amp}$= 80 km, α=0.2 dBkm$^{-1}$, $L_{eff}$=21.5 km and a network with 9 fibre lengths then the MSSI equipment would be located at the fifth amplifier location. A length of fibre 58.5 km would be added intermediate the MSSI equipment and the optical amplifier and a 21.5 km length of fibre would be inserted at the receiver. Again it may be necessary to insert additional amplifiers to give the symmetrical positioning of the high-power regions or if optical signal levels are sufficiently low as to cause bit error rate degradation.

Figure 7A:
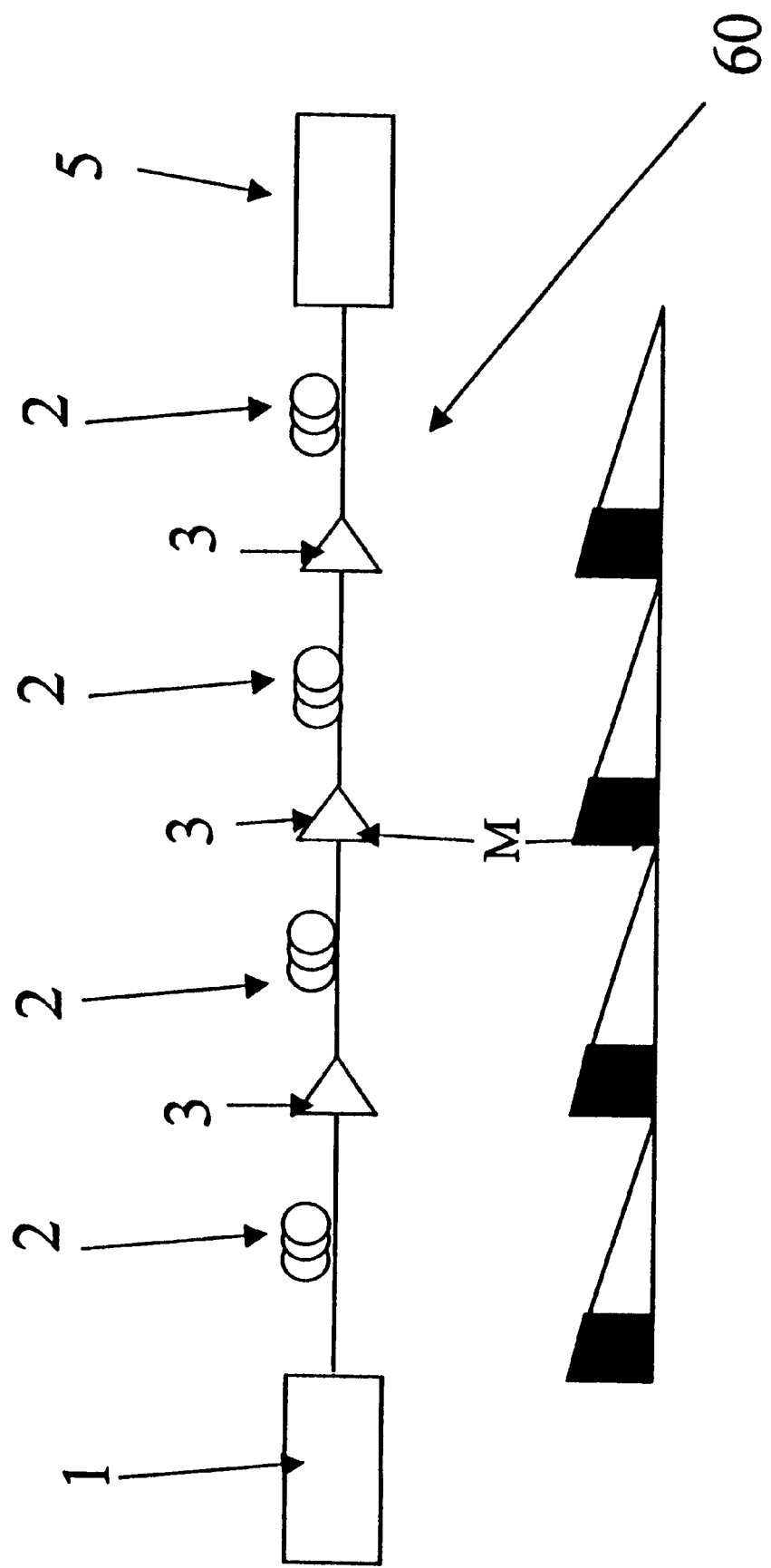
FIG. 7(a) is a schematic depiction of a further optical communications network.
Figure 7B:
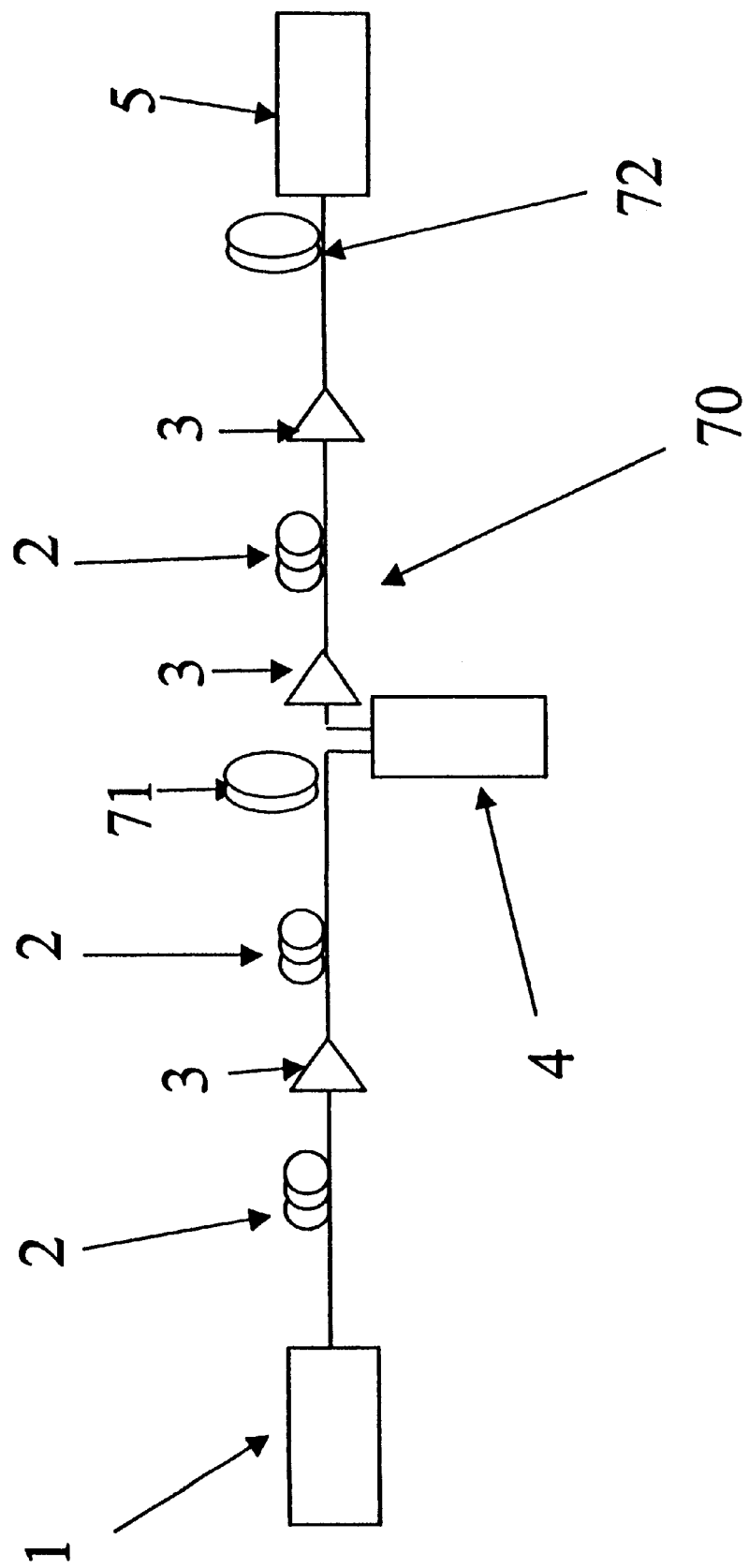
FIG. 7(b) is a schematic depiction of the optical communications network shown in FIG. 7(a) adapted to include a solution to the problem of dispersion compensation using the symmetrised MSSI method according to the present invention.

FIG. 7(a) depicts a long range optical transmission network 60 with regular amplifier spacings that has an even number of spans between successive optical amplifiers. Clearly the mid-span point of the network will be at an optical amplifier location, reducing the complexity of the network design. FIG. 7(b) shows the insertion of MSSI equipment 4 at the mid-span optical amplifier location of optical network 70. The MSSI equipment is sited immediately upstream of the optical amplifier and a length of fibre, 71, $L_{eff}$ kilometres long is sited immediately upstream of the MSSI equipment. Another length of fibre, 72, which is $L_{eff}$ kilometres long is inserted at the receiver end of the network, the inserted lengths of fibre making the high-power regions symmetrical about the MSSI equipment. Again it may be necessary to add additional amplifiers to maintain the symmetry of the high-power regions or if optical power levels are too low.

Due to the characteristics of optical fibre transmission systems the symmetrised MSSI described above is particularly suitable for use with transmission systems operating in the third transmission window of optical fibre, centred around 1550 nm. For these transmission systems preferred optical amplifiers are erbium doped fibre amplifiers, which can provide a flat gainband across the 1550 nm window. This also enables the use of multi-wavelength transmission systems (i.e. wavelength division multiplexing {WDM}) in the 1550 nm transmission window.

It will be understood that the definition of the extent of the high-power regions in the optical transmission link is open to various possible approaches. Rather than defining and determining the high-power region using Equation [53], as above, the region could be defined and determined by the loss in optical power within it, for example by defining a 3 dB loss, which is commonly used to define high-power regions as it corresponds to a 50% loss in optical power. It will also be understood that the exact definition and the extent of the high-power region does not effect the working of the invention.

The working of the invention is not limited by the manner in which the phase conjugation is performed. It is known to use either semi-conductor optical amplifiers or lengths of dispersion-shifted fibre to achieve phase conjugation: neither of these methods is preferred for the use of the current invention. Accordingly, the present invention should be suitable for use with any other form of phase conjugation. It would be especially suitable for use with a phase conjugator which did not cause a wavelength offset as this would enable the use of MSSI, and the symmetrised MSSI of the present invention, with wavelength division multiplexing transmission systems.

If symmetrised MSSI is to be used with submarine systems then it may be necessary to include additional lengths of fibre so that the symmetrisation of the high-power regions is retained whilst minimising the number of housings that will be needed to store amplifiers, etc., as these add to the cost of submarine cable systems.

What is claimed is:

1. An optical fibre transmission system comprising an optical transmitter; an optical receiver; an optical fibre transmission path linking the transmitter with the receiver; a plurality of optical amplifiers spaced apart along the transmission path; and mid-span spectral inversion means; wherein the spacing, $L_A$, between the optical amplifier immediately preceding the mid span spectral inversion means and the mid span spectral inversion means is given by $$L_A \approx \frac{L_{amp} + L_o}{2}$$

and the spacing, $L_B$, between the mid span spectral inversion means and the immediately subsequent optical amplifier is given by $$L_B \approx \frac{L_{amp} - L_o}{2}$$

where $L_{amp}$ is the mean optical amplifier spacing and $L_o$ is the overlap length, $\phi_0 l_i$.

2. An optical fibre transmission system as claimed in claim 1, wherein $L_o$ is the effective non-linear length, $L_{eff}$.

3. An optical fibre transmission system as claimed in claim 1, wherein the optical amplifiers are fibre amplifiers.

4. An optical fibre transmission system as claimed in claim 3, wherein the fibre amplifiers are erbium-doped fibre amplifiers and the optical transmitter and optical receiver both operate at a wavelength of substantially 1550 nm.

5. An optical fibre transmission system as claimed in claim 3, wherein the fibre amplifiers are erbium-doped fibre amplifiers and the optical transmitter and optical receiver both operate using wavelength division multiplexing, with the wavelengths used being contained in the window 1450 nm–1650 nm.

6. An optical fibre transmission system as claimed in claim 1, wherein the mid-span spectral inversion means comprises a semiconductor optical amplifier.

7. A method of compensating for dispersion and non-linear transmission effects in an optical transmission link having mid-span spectral inversion means, the method comprising the step of locating optical amplifiers in said optical transmissi on link such that the spacing, $L_A$, between the optical amplifier preceding the mid span spectral inversion means an d the mid span spectral inversion means is given by $$L_A \approx \frac{L_{amp} + L_o}{2}$$

and the spacing, $L_B$, between the mid span spectral inversion means and the subsequent optical amplifier is given by $$L_B \approx \frac{L_{amp} - L_o}{2}$$

where $L_{amp}$ is substantiay the mean optical amplifier spacing and $L_o$ is substantially the overlap length, $\phi_0 l_i$.

8. A method as claimed in claim 7, wherein $L_o$ is the effective non-linear length, $L_{eff}$.

9. A method as claimed in claim 7, wherein the optical amplifiers are fibre amplifiers.

10. A method as claimed in claim 9, wherein the fibre amplifiers are erbium-doped fibre amplifiers and the optical transmitter and optical receiver both operate at a wavelength of substantially 1550 nm.

11. A method as claimed in claim 9, wherein the fibre amplifiers are erbium-doped fibre amplifiers and the optical transmitter and optical receiver both operate using wavelength division multiplexing, with the wavelengths used being contained in the window 1450 nm–1650 nm.

12. A method as claimed in claim 7, wherein the mid-span spectral inversion means comprises a semiconductor optical amplifier.

13. A method of designing a optical transmission link the method comprising the step of locating optical amplifiers in said optical transmission link such that the spacing, $L_A$, between the optical amplifier preceding the mid span spectral inversion means and the mid span spectral inversion means is given by $$L_A \approx \frac{L_{amp} + L_o}{2}$$

and the spacing, $L_B$, between the mid span spectral inversion means and the subsequent optical amplifier is given by $$L_B \approx \frac{L_{amp} - L_o}{2}$$

where $L_{amp}$ is substantially the mean optical amplifier spacing and $L_o$ is substantially the overlap length, $\phi_0 l_i$.

14. A method of upgrading an optical transmission link the method comprising the step of locating optical amplifiers in said optical transmission link such that the spacing, $L_A$, between the optical amplifier preceding the mid span spectral inversion means and the mid span spectral inversion means is given by $$L_A \approx \frac{L_{amp} + L_o}{2}$$

and the spacing, $L_B$, between the mid span spectral inversion means and the subsequent optical amplifier is given by $$L_B \approx \frac{L_{amp} - L_o}{2}$$

where $L_{amp}$ is substantially the mean optical amplifier spacing and $L_o$ is substantially the overlap length, $\phi_0 l_i$.

* * * * *